(12) United States Patent
Adkisson (10) Patent No.: US 7,373,565 B2
(45) Date of Patent: May 13, 2008

(54) START/STOP CIRCUIT FOR PERFORMANCE COUNTER

(75) Inventor: Richard Adkisson, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 316 days.

(21) Appl. No.: 11/209,215

(22) Filed: Aug. 23, 2005

(65) Prior Publication Data

US 2007/0168807 A1    Jul. 19, 2007

(51) Int. Cl.
*G01R 31/28* (2006.01)
*G06F 11/00* (2006.01)

(52) U.S. Cl. ......................... 714/724; 714/47
(58) Field of Classification Search ................. 714/724
See application file for complete search history.

(56) References Cited

U.S. PATENT DOCUMENTS

| | | | | |
|---|---|---|---|---|
| 3,627,947 | A | * | 12/1971 | Mann et al. ............... 178/69 A |
| 3,641,534 | A | * | 2/1972 | Irwin ........................... 360/51 |
| 3,868,626 | A | * | 2/1975 | Masher ....................... 340/939 |
| 3,967,176 | A | * | 6/1976 | Wagener et al. ............ 318/603 |
| 5,651,112 | A | | 7/1997 | Matsuno et al. |
| 5,727,167 | A | | 3/1998 | Dwyer et al. |
| 5,796,633 | A | | 8/1998 | Burgess et al. |
| 5,835,702 | A | | 11/1998 | Levine et al. |
| 5,881,223 | A | | 3/1999 | Agrawal et al. |
| 6,112,317 | A | | 8/2000 | Berc et al. |
| 6,112,318 | A | | 8/2000 | Jouppi et al. |
| 6,360,337 | B1 | | 3/2002 | Zak et al. |
| 6,463,553 | B1 | | 10/2002 | Edwards |
| 6,487,683 | B1 | | 11/2002 | Edwards |
| 6,502,210 | B1 | | 12/2002 | Edwards |
| 6,546,359 | B1 | | 4/2003 | Week |
| 6,557,119 | B1 | | 4/2003 | Edwards et al. |
| 6,615,370 | B1 | | 9/2003 | Edwards et al. |
| 6,684,348 | B1 | | 1/2004 | Edwards et al. |
| 6,732,307 | B1 | | 5/2004 | Edwards |
| 6,912,673 | B1 | * | 6/2005 | Wyland ........................ 714/43 |
| 7,185,117 | B2 | * | 2/2007 | Yamada et al. ................. 710/4 |
| 7,191,254 | B2 | * | 3/2007 | Yamada et al. ................. 710/4 |

FOREIGN PATENT DOCUMENTS

| | | |
|---|---|---|
| GB | 2393272 | 3/2004 |
| WO | WO 97/34157 | 9/1997 |

* cited by examiner

*Primary Examiner*—James C. Kerveros (57) ABSTRACT

A circuit for tracking a number of clock cycles between occurrences of an event of interest. The circuit includes logic for asserting a run signal responsive to a first occurrence of the event of interest, logic for deasserting the run signal responsive to a second occurrence of the event of interest, and logic for incrementing a count value on each clock cycle while the run signal is asserted.

30 Claims, 5 Drawing Sheets

START/STOP CIRCUIT FOR PERFORMANCE COUNTER

REFERENCE TO RELATED APPLICATIONS

This application discloses subject matter that is related to the subject matter of the following: U.S. patent application Ser. No.: 11/022,021, filed Dec. 23, 2004 entitled "EDGE DETECT CIRCUIT FOR PERFORMANCE COUNTER"; U.S. patent application Ser. No.: 11/021,259, filed Dec. 23, 2004 entitled "DURATION MINIMUM AND MAXIMUM CIRCUIT FOR PERFORMANCE COUNTER; U.S. patent application Ser. No.: 11/022,079, filed Dec. 23, 2004 entitled "PERFORMANCE MONITORING SYSTEM"; U.S. patent application Ser. No.: 11/022,023, filed Dec. 23, 2004 entitled "MATCH CIRCUIT FOR PERFORMING PATTERN RECOGNITION IN A PERFORMANCE COUNTER"; U.S. patent application Ser. No.: 10/635,103, filed Aug. 6, 2003 entitled "DATA SELECTION CIRCUIT FOR PERFORMANCE COUNTER"; U.S. patent application Ser. No.: 10/635,373, filed Aug. 6, 2003 entitled "ZEROING CIRCUIT FOR PERFORMANCE COUNTER"; and U.S. patent application Ser. No.: 10/635,083, filed Aug. 6, 2003 entitled "GENERAL PURPOSE PERFORMANCE COUNTER"; all of which are hereby incorporated by reference in their entirety.

BACKGROUND

Increasing demand for computer system scalability (i.e., consistent price and performance and higher processor counts) combined with increases in performance of individual components continues to drive systems manufacturers to optimize core system architectures. One such systems manufacturer has introduced a server system that meets these demands for scalability with a family of application specific integrated circuits ("ASICs") that provide scalability to tens or hundreds of processors, while maintaining a high degree of performance, reliability, and efficiency. The key ASIC in this system architecture is a cell controller ("CC"), which is a processor-I/O-memory interconnect and is responsible for communications and data transfers, cache coherency, and for providing an interface to other hierarchies of the memory subsystem.

In general, the CC comprises several major functional units, including one or more processor interfaces, memory units, I/O controllers, and external crossbar interfaces all interconnected via a central data path ("CDP"). Internal signals from these units are collected on a performance monitor bus ("PMB"). One or more specialized performance counters, or performance monitors, are connected to the PMB and are useful in collecting data from the PMB for use in debugging and assessing the performance of the system of which the CC is a part. Previously, each of the performance counters have been capable of collecting data from only one preselected portion of the PMB, such that the combination of all of the performance counters together can collect all of the data on the PMB. While this arrangement is useful in some situations, there are many situations in which it would be advantageous for more than one of the performance counters to access data from the same portion of the PMB. Additionally, it would be advantageous to be able to use the performance counters to determine the amount of time that transpires between occurrences of a particular event. These applications are not supported by the state-of-the-art performance counters.

DETAILED DESCRIPTION OF THE DRAWINGS

In one embodiment, the invention is directed to a circuit for tracking a number of clock cycles between occurrences of an event of interest. The circuit comprises logic for asserting a run signal responsive to a first occurrence of the event of interest; logic for deasserting the run signal responsive to a second occurrence of the event of interest; and logic for incrementing a count value on each clock cycle while the run signal is asserted.

In the drawings, like or similar elements are designated with identical reference numerals throughout the several views thereof, and the various elements depicted are not necessarily drawn to scale.

Figure 1:
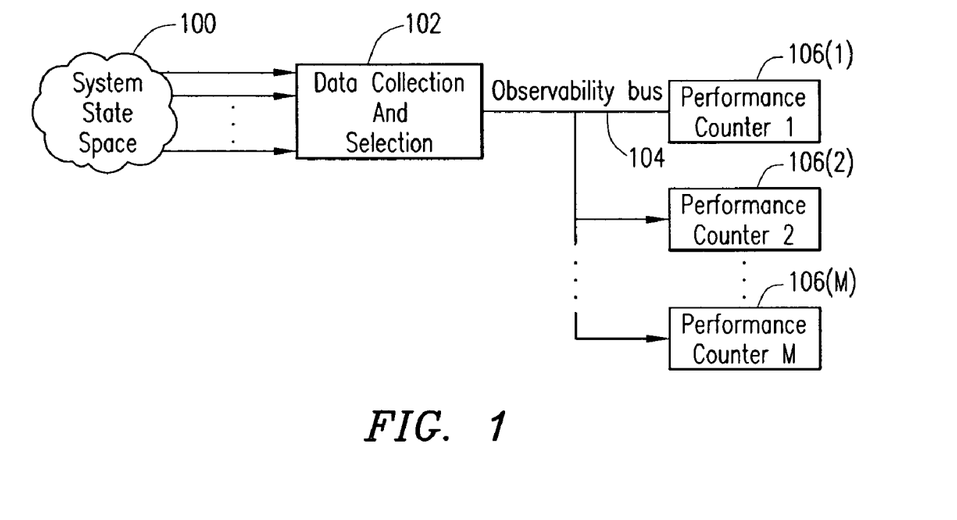
FIG. 1 is a block diagram illustrating general purpose data collection in a logic design.

FIG. 1 is a block diagram of general purpose data collection in a logic design. As shown in FIG. 1, the state space 100 of a logic design under consideration is driven to data collection and selection logic 102. The logic 102 drives a D-bit data collection, or observability, bus 104 carrying a D-bit debug_bus signal to a plurality of performance counters 106(1)-106(M).

In one embodiment, D is equal to 80, M is equal to 12, and performance counters 106(1)-106(M-1) are general purpose performance counters, while the remaining performance counter 106(M) increments on every clock cycle. As will be illustrated below, the general purpose performance counters are "general purpose" in that each of them is capable of accessing any bit of the 80-bits on the bus 104; moreover, all of them may access the same block of bits and do the same or different performance calculations thereon.

Figure 2:
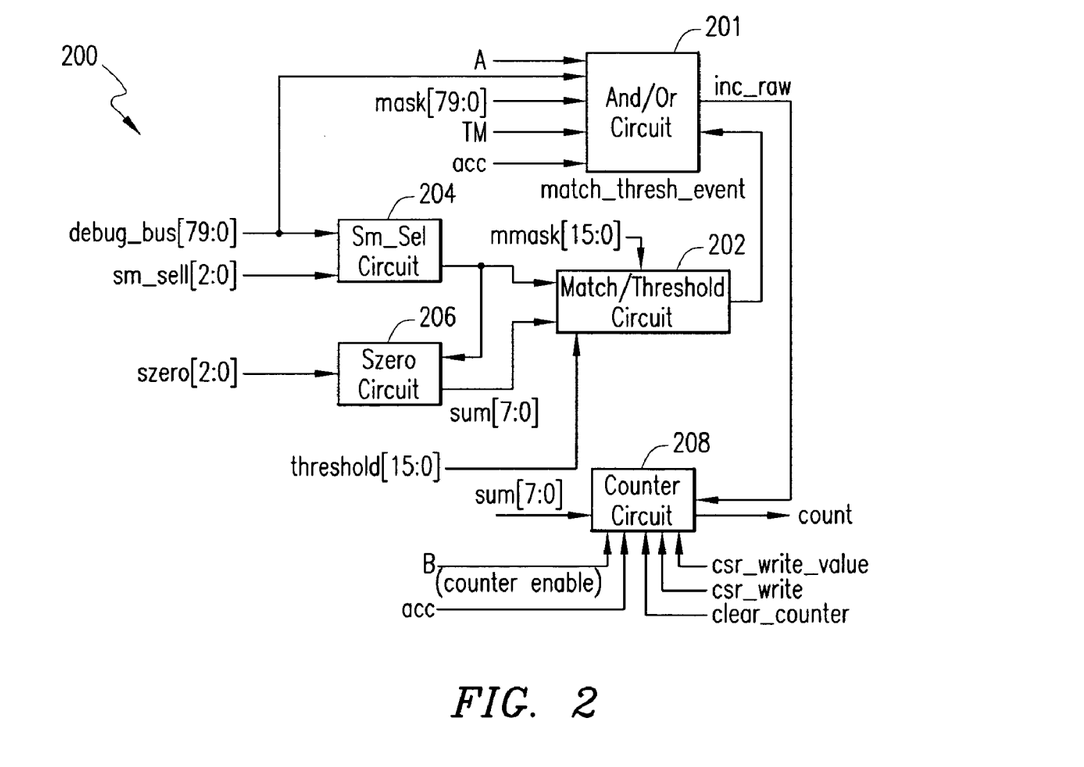
FIG. 2 is a block diagram of a general purpose performance counter according to one embodiment.

FIG. 2 is a block diagram of a general purpose performance counter 200, which is identical in all respects to each of the performance counters 106(1)-106 (M-1) (FIG. 1), in accordance with one embodiment. As will be described in greater detail below, the performance counter 200 can be used to perform general purpose operations to extract performance, debug, or coverage information with respect to any system under test (SUT) such as, for instance, the system state space 100 shown in FIG. 1. The performance counter 200 includes an AND/OR circuit 201, a match/threshold circuit 202, an sm_sel circuit 204, an zero circuit 206, and a counter circuit 208.

Figure 3A:
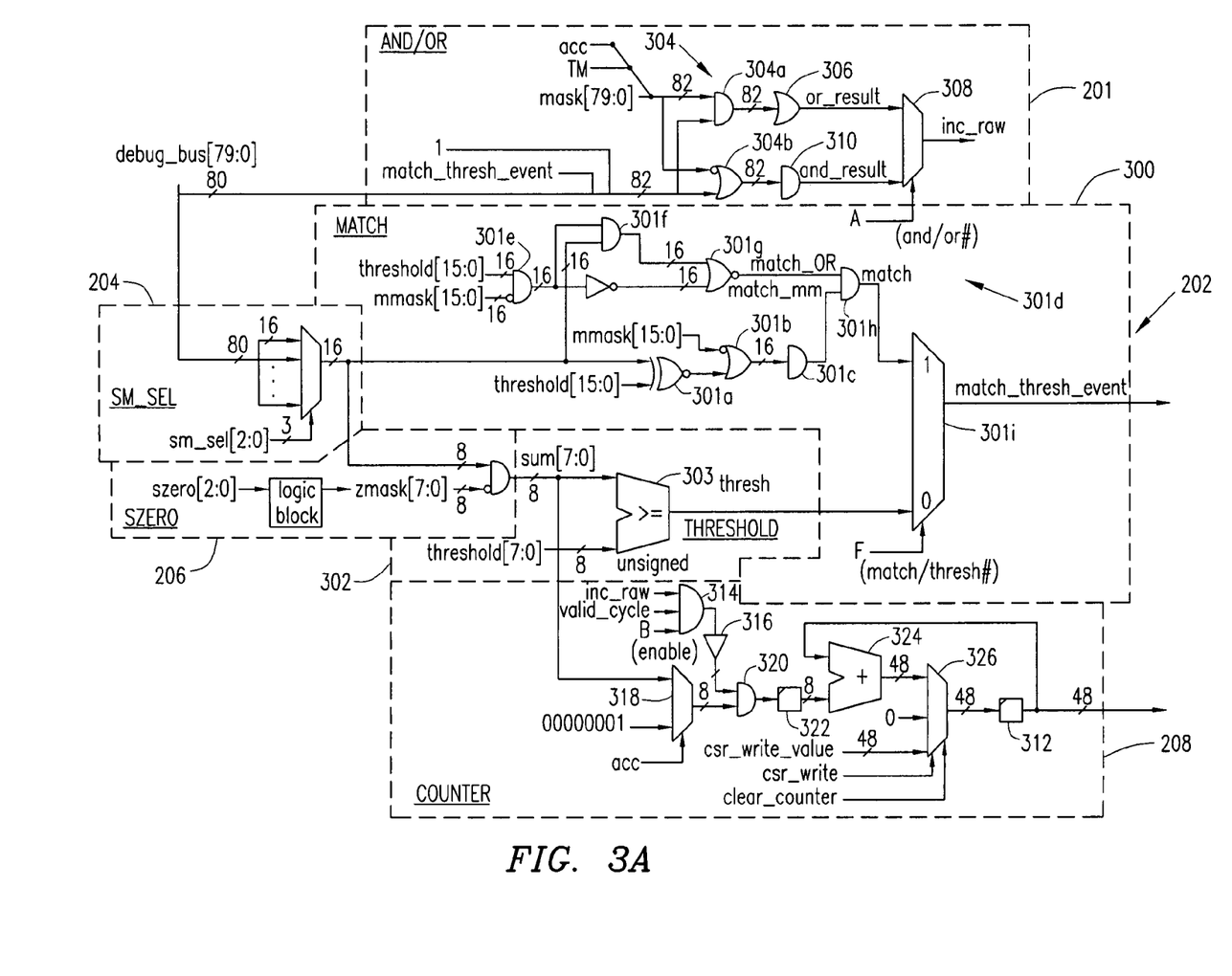
FIG. 3A is a more detailed block diagram of the general purpose performance counter of FIG. 2.
Figure 3B:
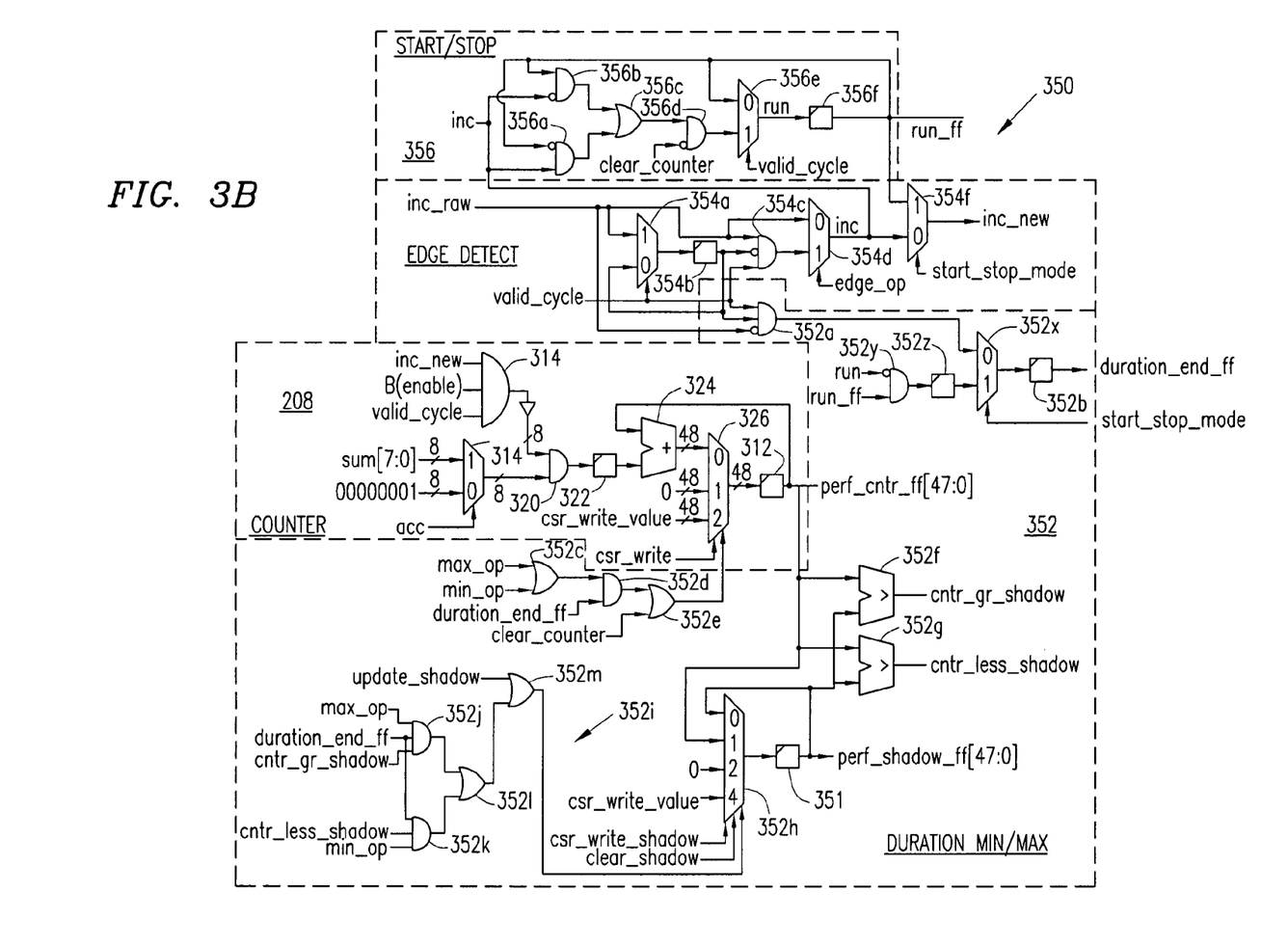
FIG. 3B is a detailed block diagram of an edge detect, duration Min/Max, and start/stop circuit enhancement to the general purpose performance counter of FIG. 3A.

In general, the AND/OR circuit 201 enables access to all of the bits of the debug_bus signal coming into the performance counter 200 via the observability bus 104. In one embodiment, as illustrated in FIGS. 2, 3A, and 3B, debug_bus is an 80-bit signal. When the AND/OR circuit 201 is operating in AND mode, the circuit activates an "inc_raw" signal if all of the bits of the debug_bus signal plus two bits that are appended thereto, as will be described in greater detail below, that are of interest (as indicated by the value of an 80-bit "mask" plus two bits that are appended thereto) are set. When the AND/OR circuit 201 is operating in OR mode, the circuit activates the inc_raw signal if any one or more of the bits of the debug_bus signal plus the two additional bits that are of interest (as indicated by the value the mask plus the two additional bits) are set.

When the match/threshold circuit 202 is operating in "match" mode, a match portion 300 (FIG. 3A) of the circuit activates a match_thresh_event signal to the AND/OR circuit 201 when an N-bit portion of the debug_bus signal selected as described in greater detail below with reference to the sm_sel circuit 204 and the zero circuit 206 matches an N-bit threshold (or pattern) for all bits selected by an N-bit match mask ("mmask"). In one embodiment, for all bits of the selected N-bit debug bus signal portion that are "don't cares", the corresponding bit of mmask will be set to 0 and the corresponding bit of the threshold will be set to 0. For all bits of the selected N-bit debug bus signal portion that are "ORs" or "Rs", as will be described in detail below, the corresponding bit of mmask will be set to 0 and the corresponding bit of the threshold will be set to 1. Finally, for all bits of the selected N-bit debug bus signal portion that are not "don't cares" or "ORs", the corresponding bit of mmask will be set to 1.

The embodiment illustrated in FIG. 3A enhances the normal match with an "R" term without using any control bits in addition to mmask (the mask) and threshold (the match). This embodiment can be used for any match circuit and for any pattern recognition; it is not limited to performance counters. In particular, a match occurs if any "R" bit is a one. This is the equivalent of an ORing of all "R" input bits. If all "R" bits are zero, there is no match.

The match_thresh_event signal is one of the two bits appended to the debug_bus signal. In the illustrated embodiment, N is equal to 16. In general, when the match/threshold circuit 202 is operating in match mode, the match portion 300 detects in the debug_bus signal any arbitrary binary pattern of up to N bits aligned on 10-bit block boundaries. This includes matching a one, zero, or "don't care" ("X") on any bit. Additionally, as indicated above, in one embodiment, the detecting includes matching the results of an "OR" operation on all designated bits ("R"). This allows detection of specific packets or specific groups of packets or states.

In one embodiment, the match portion 300 comprises an exclusive NOR ("XNOR") circuit, represented in FIG. 3A by a single XNOR gate 301a, for bit-wise exclusive-NORing ("XNORing") a selected N-bit portion of the debug_bus signal output from the sm_sel circuit 204, as described in detail below, with an N-bit threshold which may be output from a control status register ("CSR") (not shown), for example. An N-bit signal output (i.e., a first intermediary output) from the XNOR circuit (represented by the XNOR gate 301a, although there may be as many as N such gates) is input to an OR circuit, represented in FIG. 3A by a single OR gate 301b, where it is bit-wise ORed with the inverse of the N-bit mmask, which may be provided by a CSR (not shown) in one embodiment. The N-bit output (i.e., a second intermediary output) of the OR circuit represented by the OR gate 301b (each of the N output bits being generated by a signal 2-input OR gate) are input to an N-bit AND gate 301c, the output of which comprises a one-bit "match_mm" signal.

As described in greater detail in U.S. patent application Ser. No.: 11/022,023, filed Dec. 23, 2004 entitled "MATCH CIRCUIT FOR PERFORMING PATTERN RECOGNI-TION IN A PERFORMANCE COUNTER", the match circuit 300 further includes an enhancement portion 301d for matching the "R" bits. The enhancement portion 301d includes an AND circuit, represented in FIG. 3A by a single AND gate 301e, for bit-wise ANDing the inverse of the N-bit mmask with the N-bit threshold. The N-bit output of the AND circuit 301e is input to an AND circuit, represented in FIG. 3A by a single AND gate 301f, where it is bit-wise ANDed with the selected N-bit portion of the debug_bus signal output from the sm_sel circuit 204. The N-bit output of the AND circuit 301f is input to an OR circuit 301g, where it is ORed with the single-bit NOR (provided by N-bit NOR gate) of the N-bit output of the AND circuit 301e to generate a single bit "match_OR" signal. The match_OR signal and the match_mm signal are input to an AND gate 301h, the output of which is input to one input of a two-input MUX 301i as a "match" signal. When the match/threshold circuit 202 is operating in match mode (as controlled by a selection control signal, e.g., the match/thresh# control signal), the match signal is output from the MUX 301i as the match_thresh_event signal to the AND/OR circuit, as described above.

As a result of the operation of the match portion 300, no extra random logic is required for decoding packets or states into "one-hot" signals, which are 1-bit signals that transition to a logic "1" for each value of the state. The match/threshold circuit 202 requires an N-bit pattern field and an N-bit mask field. In addition, the embodiment described herein can match a wider range of patterns than a conventional match circuit, which corresponds to a level of AND gates.

To reduce the number of control bits required, in the embodiment illustrated in FIG. 3A, the N-bit pattern field is the same field used for a threshold portion 302 of the circuit 202, as described below, as it is unlikely that both the match portion 300 and the threshold portion 302 will be used at the same time, especially if the sm_sel circuit 204 supplies the same N bits to both.

When the match/threshold circuit 202 is operating in "threshold" mode, the threshold portion 302 of the circuit 202 activates the match_thresh_event signal to the AND/OR circuit 201 when an S-bit portion of the debug_bus signal selected and zeroed as described in greater detail below with reference to the sm_sel circuit 204 and the zero circuit 206 is equal to or greater than the threshold. In the illustrated embodiment, S is equal to N/2, or 8.

A compare circuit 303 of the threshold portion 302 compares a sum[7:0] signal output from the zero circuit 206, described below, with the least significant S bits of the N-bit threshold signal and outputs a logic one if the former is greater than or equal to the latter and a zero if it is not. The output of the compare circuit 303 is input to a second input of the MUX 301i as a thresh signal. When the match/threshold circuit 202 is operating in threshold mode, the thresh signal is output from the MUX 301i as the match_thresh_event signal to the AND/OR circuit, as described above.

It will be recognized that in systems in which the performance counter 200 and the logic block monitored thereby are in two different clock domains, the match/threshold circuit 202 will be modified to take advantage of a "core mode functionality," in which a valid_cycle control signal is generated in accordance with the teachings of U.S. patent application Ser. No.: 11/022,079, filed Dec. 23, 2004 entitled "PERFORMANCE MONITORING SYSTEM". Briefly, in some instances, the performance counter 200 may be used to examine the inner workings of logic hardware that is in a different clock domain than the performance counter. Core mode supports the disabling of the performance counter on invalid clock cycles and enables advanced features to ignore the invalid cycles.

The sm_sel circuit 204 selects an N-bit portion of the debug_bus signal aligned on a selected 10-bit block boundary into both the match portion 300 and the threshold portion 302 (FIG. 3A) of the match/threshold circuit 202 and to a sum input of the counter circuit 208. As previously stated, in the illustrated embodiment, N is equal to 16. The zero circuit 206 zeroes out none through all but one of S bits aligned on a selected 10-bit block boundary into the threshold portion 302 of the match/threshold circuit 202 and the sum input of the counter circuit 208. In the illustrated embodiment, S is equal to eight. The selected 10-bit block boundary is identified by the value of a three-bit control signal sm_sel input to the sm_sel circuit 204.

Additional details regarding the operation of the sm_sel circuit 204 and the zero circuit 206 are provided in U.S. patent application Ser. No.: 10/635,103, filed Aug. 6, 2003 entitled "DATA SELECTION CIRCUIT FOR PERFORMANCE COUNTER" and U.S. patent application Ser. No.: 10/635,373, filed Aug. 6, 2003 entitled "ZEROING CIRCUIT FOR PERFORMANCE COUNTER".

The counter circuit 208 is an X bit (X=48 in the illustrated embodiments) counter that can hold, increment by one, add S bits (S=8 in the illustrated embodiments), clear, or load a value into a count register. Additional details regarding the operation of the counter circuit 208 are provided in U.S. patent application Ser. No.: 10/635,083, filed Aug. 6, 2003 entitled "GENERAL PURPOSE PERFORMANCE COUNTER".

FIG. 3B illustrates an edge detect, duration min/max, and start/stop circuit enhancement 350 to the performance counter illustrated in FIG. 3A according to one embodiment. In this embodiment, a shadow register 351 samples the count signal on an interval, when software requests it, or when value in the count register 312 is larger or smaller than the value stored in the shadow register (i.e., shadow value) at the end of counting a duration. The last feature, in conjunction with duration Min/Max circuitry 352, enables the capture of a minimum or maximum duration value. Additionally, as will be described in detail below, the feature, in conjunction with start/stop circuitry 356, enables the capture of a minimum or maximum time between events.

The duration min/max circuitry 352 tracks minimum/maximum cycle counts, or durations. In particular, at the end of an event, the value of the count register 312 is stored in the shadow register 351 if it is larger than the value currently in the shadow register (when the performance counter 200 is operating in duration MAX mode) or smaller than the value currently stored in the shadow register (when the performance counter 200 is operating in duration MIN mode).

Edge detect circuitry 354 detects a rising edge on the inc_raw signal and only asserts an "inc_new" signal to the counter circuit 208 one time for each rising edge when the performance counter 200 is operating in edge detect mode.

As previously indicated, start/stop circuitry 356 detects the minimum or maximum time between events. In particular, the circuitry 356 causes the value of the count register 312 to be stored in the shadow register 351 at the end of the second event if it is smaller than value currently stored in the shadow register (when the performance counter 200 is operating in START/STOP MIN mode) or if it is larger than the value currently stored in the shadow register (if the performance counter is operating in START/STOP MAX mode). At the end of the second event, the count register 312 is cleared such that it can start counting at the next occurrence of the event.

In one embodiment, the performance counter 200 operates in edge detect mode when an "edge_op" signal is asserted, in duration MAX mode when a "max_op" signal is asserted and a "start_stop_mode" signal is not asserted, in duration MIN mode when a "min_op" signal is asserted and a start_stop_mode signal is not asserted, in START/STOP MAX mode when both the max_op and start_stop_mode signals are asserted, and in a START/STOP MIN mode when both the min_op and the start_stop_mode signals are asserted. The performance counter 200 operates in normal mode when none of the aforementioned "op" or "_mode" signals is asserted.

As previously indicated, in normal operational mode, the performance counter 200 counts the number of cycles an event of interest is active. The embodiment of the edge detect circuitry 354 described herein enables the performance counter 200 operate in edge detect mode, in which the performance counter counts the number of times an event occurs. For example, assuming a state machine begins in state=0, transitions to state=2 and remains there for three cycles, transitions to state=1 and remains there for some number of cycles, transitions to state=2 and remains there for four cycles, transitions to state=3 and remains there for some number of cycles, transitions to state=2 and remains there for two cycles, and then transitions back to state=0. It will be assumed for the sake of example that the event of interest is state=2.

In normal mode, the performance counter 200 counts the number of cycles the designated event is active; in this case, nine cycles. In contrast, the edge detection circuitry 354 enables a performance counter 200, when in edge detect mode, to count the number of times the state machine transitions to state=2. In edge detect mode, the performance counter 200 counts three zero (i.e., not in state=2) to one (i.e., in state=2) transitions. Accordingly, in the current example, the count of a performance counter operating in edge detect mode indicates the number of times the event of interest (i.e., transition to state=2) occurred (i.e., three).

It should be noted that, although the illustrated embodiment shows a rising edge detect circuit, a falling edge detect circuit could also be implemented for the purposes described herein and may be preferable under certain circumstances.

By operating one performance counter in normal mode to count the number of cycles an event of interest is active and operating another in edge detect mode to count the number of times the same event occurs, it is possible to determine the average number of cycles the event is active. Referring again to the above example, the first performance counter would indicate that the event (state=2) was active for nine cycles; the second performance counter would indicate that the event occurred three times. Accordingly, the average number of cycles the event was active (i.e., the average number of cycles state=2) is three.

Details regarding the operation of the edge detect circuitry 354 are provided in U.S. patent application Ser. No.: 11/022,021, filed Dec. 23, 2004 entitled EDGE DETECT CIRCUIT FOR PERFORMANCE COUNTER, previously incorporated by reference.

Typically, a performance counter counts the number of cycles an event is active; however, it does not track the maximum or minimum duration of an event during a time period of interest. The duration Min/Max circuitry 352 enables the performance counter 200 to report the minimum time an event persists when it is active or the maximum time an event persists when it is active. Using the example set forth above with respect to the state machine, in which the event of interest is state=2, in duration MIN mode, the shadow register will capture three (cycles), ignore the four (cycles) (because three is less than four), and then capture two (cycles) (because two is less than three). In duration MAX mode, the shadow register will capture three (cycles), then capture four (cycles) (because four is greater than three), and ignore two (cycles) (because four is greater than two). Accordingly, the minimum duration of the event (state=2) during the period of interest is two cycles and the maximum duration of the event is four cycles. Additional details regarding operation of the duration Min/Max circuitry 352 are provided in U.S. patent application Ser. No.: 11/021,259, filed Dec. 23, 2004 entitled DURATION MINIMUM AND MAXIMUM CIRCUIT FOR PERFORMANCE COUNTER.

Additionally, the start/stop circuitry 356 enables the performance counter 200 to report the minimum time between events (in START/STOP MIN mode) or the maximum time between events (in START/STOP MAX mode).

The edge detection circuitry 354 will now be described in greater detail. The circuitry 354 includes a two-input MUX 354a for receiving the inc_raw signal at one input and an inc_hold_FF signal at the other input. The output of the MUX 354a is input to a flip flop 354b, the output of which comprises the inc_hold_FF signal, which is fed back to the MUX 354a, as previously described. The valid_cycle control signal described above comprises the select signal for the MUX 354a such that when the valid_cycle signal is asserted, the inc_raw signal is output from the MUX 354a; otherwise, the inc_hold_ff signal is output from the MUX. The inc_hold_ff signal is inverted and ANDed with the inc_raw signal and the valid cycle signal via a three input AND gate 354c. The output of the AND gate 354c is input to one input of a two-input MUX 354d, the other input of which is connected to receive the inc_raw signal. The edge_op signal serves as the select signal to the MUX 354d, such that when the performance counter 200 is operating in edge detect mode, the signal output from the AND gate 354c is output from the MUX 354d as the inc signal; otherwise (i.e., in normal operation), the inc_raw signal is output from the MUX 354d as the inc signal.

The inc signal output from the MUX 354d is input to one input of a two-input MUX 354f, the other input of which is connected to receive a run_ff signal from the start/stop circuit 356. A select input of the MUX 354f is connected to receive the start_stop_mode signal, such that when the start_stop_mode signal is asserted, the run_ff signal is output from the MUX 354d as the inc_new signal; otherwise, the inc signal is output from the MUX 354d as the inc_new signal.

It will be noted that the flip flop 354b and the AND gate 354c serve as rising-edge detect circuitry for the edge detect circuitry 354 and the output of the AND gate 354c will be driven high responsive to a zero-to-one transition of the inc_raw signal; otherwise, the output of the AND gate 354c will remain zero. The foregoing assumes, of course, that the cycle is valid (i.e., valid_cycle is asserted).

The circuitry 352 includes falling edge detect logic comprising a three-input AND gate 352a for ANDing the valid_cycle signal, the inc_hold_ff signal output from the flip flop 354b, and the inc_raw signal. The output of the AND gate 352a is input to a first input of a MUX 352x. The inverse of a run signal from the start/stop circuit 356 is ANDed with the run_ff signal from the circuit 356 via an AND gate 352y. The output of the AND gate 352y is input to a second input of the MUX 352x via a flip flop 352z. A select input of the MUX 352x is connected to receive the start_stop_mode signal. A signal output from the MUX 352x is input to a flip flop 352b, the output of which comprises a duration_end_ff signal. It will be recognized that flip flop 354b, the AND gate 352a, and the flip flop 352b serve as falling-edge detect circuitry for the duration Min/Max circuitry 352 and the output of the AND gate 352a will be driven high responsive to a one-to-zero transition of the inc_raw signal; otherwise, the output of the AND gate 352a will remain zero. The foregoing assumes, of course, that the cycle is valid (i.e., valid_cycle is asserted). The circuitry can be implemented without regard to valid cycles by eliminating the valid_cycle input of the AND gate 352a. As will be described, activation of duration_end_ff indicates that the event of interest has ended.

The start/stop circuit 356 will now be described in greater detail. In particular, the inc signal output from the MUX 354d is ANDed with the inverse of the run_ff signal output from the circuit 356 via an AND gate 356a. Similarly, the inverse of the inc signal is ANDed with the run_ff signal via an AND gate 356b. The signals output from the AND gates 356a, 356b, are ORed via an OR gate 356c, the output of which is ANDed with the inverse of the clear_counter signal via an AND gate 356d. The output of the AND gate 356d is input to one input of a two-input MUX 356e, the other input of which is connected to receive the run_ff signal. A select input of the MUX 356e is connected to receive the valid_cycle signal. The run signal output from the MUX 356e is input to a flip flop 356f, the output of which comprises the run_ff signal.

In general, the start/stop circuit 356 takes the inc signal and uses it to set and subsequently clear run_ff. In particular, assertion of the clear_counter signal also clears run_ff. The first time subsequent to assertion of clear_counter that inc is asserted, run_ff is set; the next time the inc signal is asserted, run_ff is cleared. Accordingly, run_ff, and, as a direct result, inc_new, remain high during the time between occurrences of an event as indicated by the inc signal while start_stop_mode is asserted. In this manner, the counter circuit 208 is caused to count the number of cycles during which run_ff/inc_new are active, thereby counting the number of cycles between occurrences of an event (i.e., between a first occurrence and a second occurrence).

Referring again to the circuit 356, as previously indicated, when clear_counter is asserted, run and run_ff are driven low (via the AND gate 356d) and remain low until the first time thereafter that inc is asserted. The first assertion of inc results in the output of the AND gate 356a being driven high. This signal cascades through the circuit and results in run being driven high, with run_ff being driven high one cycle after run goes high. Thereafter, when inc goes low, the output of the AND gate 356a goes low, but because run_ff is high, the output of the AND gate 356b goes high, and therefore run and run_ff remain high. When inc is again asserted, the output of the AND gate 356a remains low and the output of the AND gate 356b is driven low. As a result, the run signal is driven low, with run_ff being driven low a cycle thereafter.

As a result, it is apparent from the foregoing that when the performance counter 200 is operating in START/STOP mode, when run_ff is high and run goes low, the end of the event has been reached. Accordingly, when start_stop_mode is asserted, the AND gate 352y drives duration_end_ff high at the end of the event, as indicated by run being low and run_ff being high.

Figure 3C:
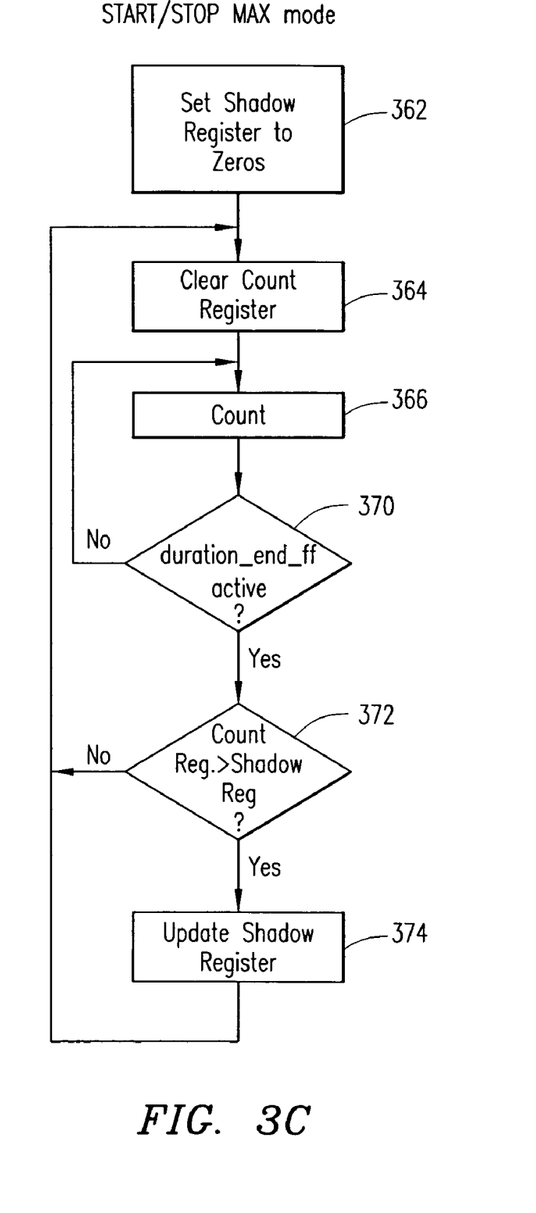
FIGS. 3C and 3D are flowcharts illustrating operation of the duration Min/Max circuit enhancement of FIG. 3B in duration MAX and duration MIN modes, respectively.
Figure 3D:
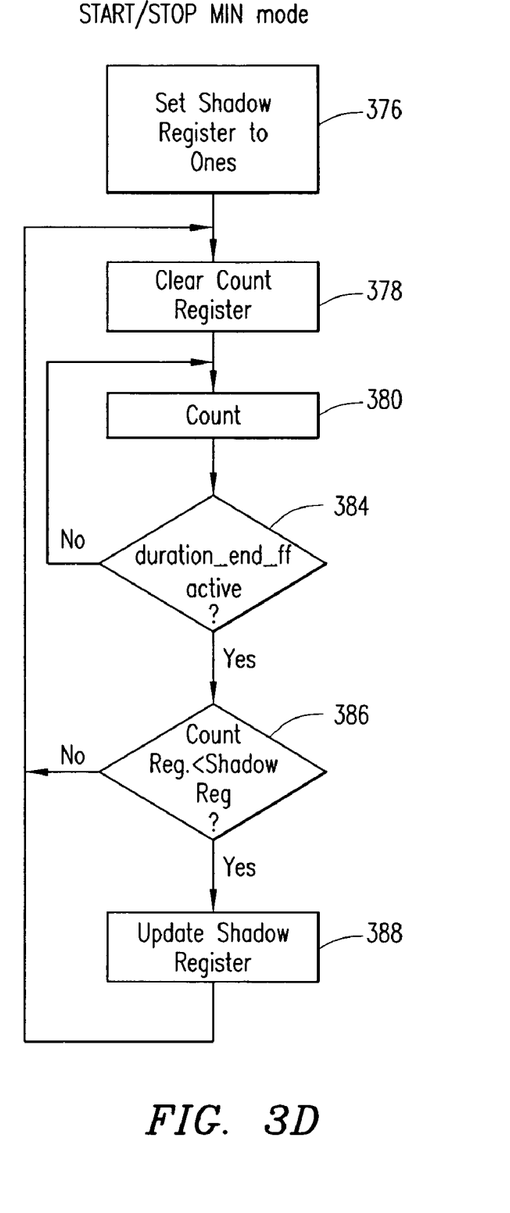

FIGS. 3C and 3D are flowcharts illustrating operation of the start/stop mode circuitry 356 in START/STOP MAX mode and START/STOP MIN mode, respectively, in accordance with one embodiment. It should be noted that, in the embodiment illustrated in FIG. 3B, it is assumed that the circuitry 356 operates in only one of either START/STOP MAX mode (max_op and start_stop_mode asserted), in which the maximum time between occurrences of an event of interest is tracked, or in START/STOP MIN mode (min op and start_stop_mode asserted), in which the minimum time between occurrences of an event of interest is tracked, but not both simultaneously. In particular, as shown in FIG. 3B, the one of the select inputs of the MUX 326 that was previously connected directly to a clear_counter signal (FIG. 3A) is now connected to a logic circuit comprising a first two-input OR gate 352c, a two input AND gate 352d, and a second two-input OR gate 352e. The max_op and min_op signals are input to the first two-input OR gate 352c, the output of which is input to one input of the AND gate 352d. The other input of the AND gate 352d is connected to receive the duration_end_ff signal from the flip flop 352b.

The output of the AND gate 352d is input to one input of the OR gate 352e, the other input of which is connected to receive the clear_counter signal. As a result, the count register 312 will be cleared whenever either of the following is true:

1. clear_counter is asserted; or
2. either max op or min op is asserted and duration_end_ff is asserted.

It will be recognized, however, that appropriate modifications may be made to the circuitry 352 such that both minimum and maximum duration could be simultaneously tracked for the event of interest.

As previously noted, FIG. 3C illustrates operation of the circuitry 352 while max_op and start_stop_mode are asserted (i.e., during START/STOP MAX mode). Accordingly, in step 362, the value stored in the shadow register 351 is set to all zeros. In step 364, the value of the count register 312 is cleared. In step 366, the performance counter performs in accordance with the operational description set forth above with reference to FIG. 3A and the value stored in the count register 312 is incremented accordingly while an event is active.

In step 370, a determination is made whether a duration_end_ff signal is asserted, indicating that the end of the event has been detected, as described above. If not, execution returns to step 366; otherwise, execution proceeds to step 372.

In step 372, a determination is made whether the value stored in the count register 312 is greater than the value stored in the shadow register 351. This step 372 is performed by a comparator 352f. If so, a signal cntr_gr_shadow is asserted, causing the value of the count register 312 to be written to the shadow register 351 in step 374. Execution then returns to step 364. If a negative determination is made in step 374, execution returns directly to step 364.

FIG. 3D illustrates operation of the circuitry 352 while min_op and start_stop_mode are asserted (i.e., during START/STOP MIN mode). In step 376, the shadow register 351 is set to all ones. In step 378, a value of the count register 312 is cleared. In step 380, the performance counter 200 performs in accordance with the operational description set forth above with reference to FIG. 3A and the value stored in the count register 312 is incremented accordingly while an event is active. In step 384, a determination is made whether a duration_end_ff signal is asserted, indicating that the end of the event has been detected, as described above. If not, execution returns to step 380; otherwise, execution proceeds to step 386.

In step 386, a determination is made whether the value stored in the count register 312 is less than the value stored in the shadow register 351. This step 386 is performed by a comparator 352g. If so, a signal cntr_less_shadow is asserted, causing the value of the count register 312 to be written to the shadow register 351 in step 388. Execution then returns to step 378. If a negative determination is made in step 386, execution returns directly to step 378.

In order to accomplish the operation described with reference to FIGS. 3C and 3D, a MUX 352h is used to enable a selected one of four values input to the MUX to be written to the shadow register 351. In particular, when a signal "csr_write_shadow" is asserted and applied to a third select input, a CSR_write_value is written to the shadow register 351. This is the mechanism used to write all zeroes (in step 362) or all ones (in step 376) to the shadow register 351. When a signal "clear_shadow" is asserted and applied to a second select input, a series of zeros are written to the shadow register 351, thus clearing the register 351. The remaining select input is connected to a logic circuit 352i comprising two AND gates 352j, 352k, and two OR gates 352l, 352m. The first AND gate 352j ANDs the values of max_op, duration_end_ff, and cntr_gr_shadow. The other AND gate 352k ANDs the values of min_op, duration_end_ff, and cntr_less_shadow. The outputs of both AND gates 352j, 352k, are input to the OR gate 352l. The output of the OR gate 352l is ORed with an update_shadow signal. The output of the OR gate 352m is applied to the remaining select input of the MUX 352h.

As a result, if any one of the following is true, the value of the count register 312 will be written to the shadow register 351:

1. the signal update_shadow is asserted;
2. the performance counter is operating in either duration MAX mode or start/stop MAX mode, the event has ended (i.e., duration_end_ff is asserted), and the value of the count register 312 is greater than that of the shadow register 351; OR
3. the performance counter is operating in either duration MIN mode or start/stop MIN mode, the event has ended, and the value of the count register 312 is less than that of the shadow register 351.

In one embodiment, each general purpose performance counter, such as the performance counter 200, is 48 bits plus overflow. The performance counter 200 is general purpose in that it looks at all D bits of the debug_bus signal for an event mask plus two extra events, eight separate selections of 16 bits for the match compare operation and eight separate selections of eight bits for the threshold compare and the accumulate operations. The eight bits for the threshold compare and the accumulate operations are the bottom eight bits of the 16 bits selected for the match compare operation. Those 16 bits are aligned to 10 slot boundaries as shown in an exemplary mapping arrangement illustrated in FIG. 4.

Figure 4:
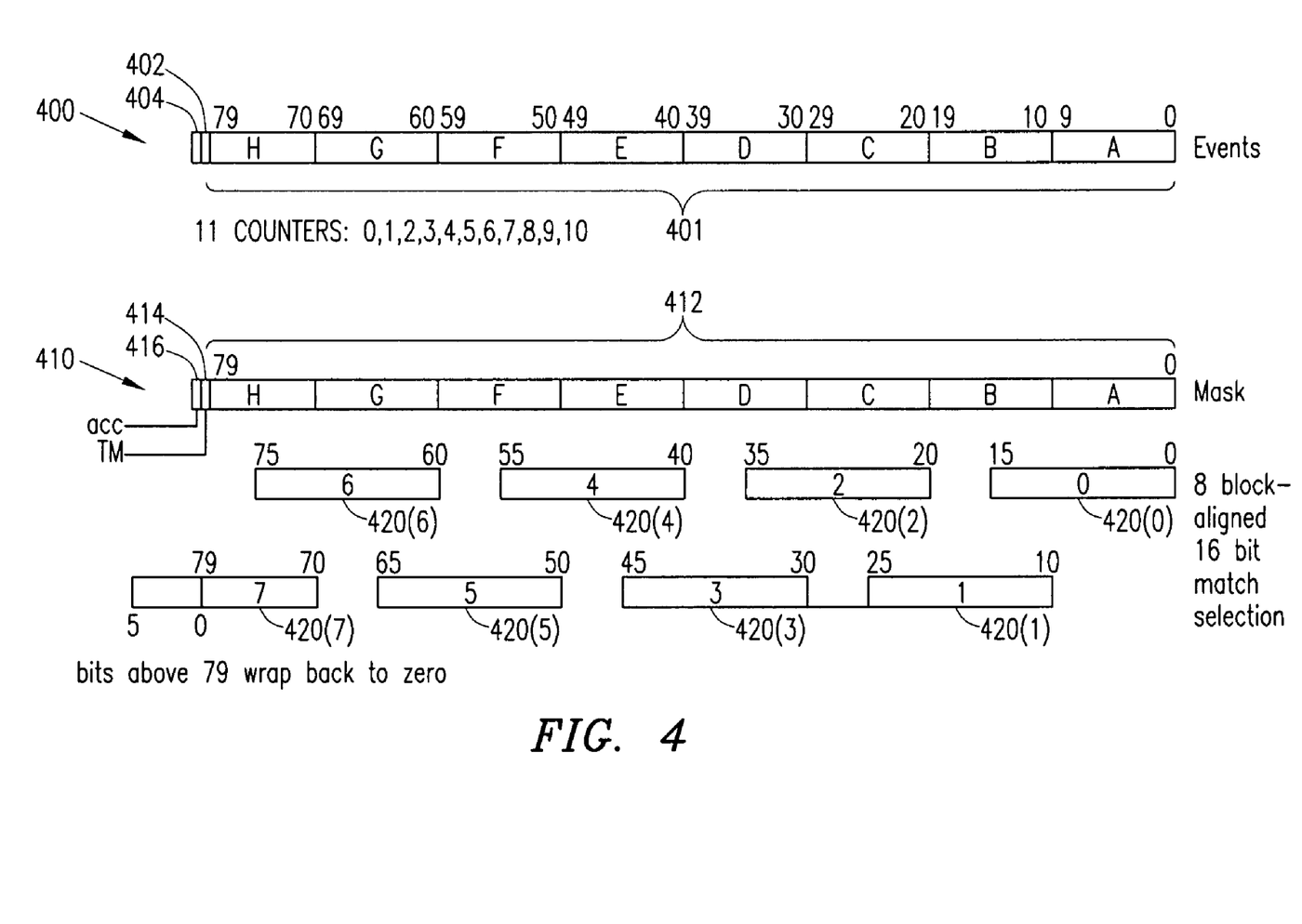
FIG. 4 illustrates a method in which signals are mapped from an observabilty bus to a performance counter in accordance with one embodiment.

In FIG. 4, an events signal 400 comprises the debug_bus signal, designated in FIG. 4 by reference numeral 401, the match_threshold_event signal, designated by reference numeral 402 and a logic 1 bit, designated by reference numeral 404. The debug_bus signal 401 comprises bits [79:0] of the events signal 400; the match_threshold_event signal 402 comprises bit [80] of the events signal, and the logic 1 bit 404 comprises bit [81] of the events signal.

As best illustrated in FIG. 3A, the events signal 400 (i.e., the debug_bus signal with the match_threshold_event signal and the logic 1 appended thereto) are input to a first logic stage 304 of the AND/OR circuit 201 for purposes that will be described in greater detail below.

Referring again to FIG. 4, a composite mask signal 410 comprises an 80-bit mask signal, designated by a reference numeral 412, a match_threshold_event mask ("TM") bit, designated by reference numeral 414, and an accumulate bit ("acc"), designated by reference numeral 416. The mask signal 412 comprises bits [79:0] of the composite mask signal 410; the TM bit 414 comprises bit [80] of the composite mask signal, and the acc bit 416 comprises bit [81] of the composite mask signal. As best illustrated in FIG. 3A, each bit of the composite mask 410 (i.e., the mask signal with the TM and acc bits appended thereto) is input to the first logic stage 304 of the AND/OR circuit 201 for purposes that will be described in greater detail below.

Continuing to refer to FIG. 4, eight 10-bit-block-aligned 16-bit match selections are respectively designated by reference numerals 420(0)-420(7). In particular, the selection 420(0) comprises bits [0:15]; the selection 420(1) comprises bits [10:25]; the selection 420(2) comprises bits [20:35]; the selection 420(3) comprises bits [30:45]; the selection 420(4) comprises bits [40:55]; the selection 420(5) comprises bits [50:65]; the selection 420(6) comprises bits [60:75]; and the selection 420(7) comprises bits [70:5] (bits above 79 wrap back to zero.

Referring again to FIG. 3A, the first logic stage 304 comprises an AND portion, represented by an AND gate 304*a*, for bit-wise ANDing the events signal 400 with the composite mask signal 410, and an OR portion, represented by an OR gate 304*b*, for bit-wise ORing the inverse of the composite mask signal 410 with the events signal 400. It will be recognized that, although represented in FIG. 3A as a single two-input AND gate 304*a*, the AND portion of the first logic stage 304 actually comprises 82 two-input AND gates. Similarly, the OR portion of the first logic stage 304 comprises 82 two-input OR gates identical to the OR gate 304*b*.

The outputs of the AND portion of the first logic stage 304 are input to an 82-input OR gate 306, the output of which is input to one input of a two-input MUX 308 as an "or_result". Similarly, the outputs of the OR portion of the first logic stage 304 are input to an 82-input AND gate 310, the output of which is input to the other input of the MUX 308 as an "and_result". A control signal ("and/or#") which may originate from a CSR (not shown) controls whether the AND/OR circuit 201 functions in AND mode, in which case the and_result is output from the MUX 308 as the inc signal, or in OR mode, in which case the or_result is output from the MUX as the inc signal.

As a result, when the AND/OR circuit 201 is operating in the AND mode, the inc signal comprises the and_result signal and will be asserted when all of the bits of the events signal 400 that are of interest as specified by the composite mask 410 are set. When the AND/OR circuit 201 is operating in OR mode, the inc signal comprises the or_result signal and will be asserted when any one of the bits of the events signal 400 that are of interest as specified by the composite mask 410 is set.

The acc bit 416 of the composite mask 410 is CSR-settable. Setting the TM bit 414 in the composite mask 410 designates the match_thresh_event signal in the events signal as a bit of interest; not setting the TM bit in the composite mask will cause the value of the match_thresh_event signal in the events signal 400, and hence the result of any match or threshold operation performed by the match/threshold circuit 202, to be ignored.

Referring again to FIG. 3B, the operation of an embodiment of a counter circuit 208 will be described in greater detail. The counter circuit 208 is an X bit counter that can hold, increment by one, add S bits, clear, or load a value into a count value register 312. Other processing may also occur in order to read the value of the count register 312. In the embodiment illustrated in FIG. 3B, X is equal to 48. Counter circuit 208 operation is enabled by setting a counter enable signal B, which comprises one input of a three-input AND gate 314 (with core mode functionality enabled). A second input of the AND gate 314 is connected to receive the inc_new signal generated from the inc_raw signal as described in detail above, while the third input is connected to receive the valid_cycle signal. It will be recognized that, where core mode functionality is not enabled, the AND gate 314 will comprise only two inputs, with the input for receiving the valid_cycle signal being omitted.

Accordingly, when the counter circuit 208 is enabled and the inc_new signal is asserted (assuming a valid cycle), a logic one is output from the AND gate 314. In any other case, the output of the AND gate 314 will be a logic zero. The output of the AND gate 314 is replicated by an 8x replicator 316 and the resulting 8-bit signal is bit-wise ANDed with an 8-bit signal output from a MUX circuit 318. The inputs to the MUX circuit 318 are the sum[7:0] signal output from the zero circuit 206 and an 8-bit signal the value of which is [00000001]. The sum[7:0] signal will be output from the MUX circuit 318 when the acc signal is asserted; otherwise, the [00000001] signal will be output from the MUX circuit.

An AND circuit, represented by an AND gate 320, bit-wise ANDs the signals output from the replicator 316 and from the MUX circuit 318. The resulting 8-bit signal is input to a register 322. An adder 324 adds the 8-bit signal stored in the register 322 to the 48-bit sum stored in the count value register 312. The new sum output from the adder 324 is input to a MUX circuit 326. Two other sets of inputs to the MUX circuit 326 are connected to a logic zero and a csr_write_value, respectively. When a csr_write enable signal to the MUX circuit 326 is asserted, the value of csr_write_value is output from the MUX circuit 326 and written to the count value register 312. In this manner, a value can be loaded into the count value register 312. Similarly, when a clear_counter_new signal is asserted, 48 zero bits are output from the MUX circuit 326 to the count value register 312, thereby clearing the register.

If neither the csr_write signal nor the clear_counter_new signal is asserted and the acc signal is asserted, the output of the adder 324 is written to the count value register 312, thereby effectively adding S bits (i.e., the value of the sum[7:0] signal) to the previous value of the count value register 312. Not enabling the counter circuit 208 results in the count value register 312 being held at its current value. Finally, to increment the value of the count value register 312 by one, the counter circuit 208 must be enabled, the inc signal must be asserted, and the acc signal must not be asserted.

As described in detail above, FIG. 4 illustrates that the entire data collection bus 104 (FIG. 1) is available for all of the performance counters represented by the performance counter 200, making them general purpose. All D bits of the debug_bus signal can be used by the AND/OR circuit 201. N bits aligned on block boundaries can be selected by the sm_sel circuit 206, enabling full coverage of the observabilty bus 104.

An implementation of the invention described herein thus provides a general purpose performance counter. The embodiments shown and described have been characterized as being illustrative only; it should therefore be readily understood that various changes and modifications could be made therein without departing from the scope of the present invention as set forth in the following claims. For example, while the embodiments are described with reference to an ASIC, it will be appreciated that the embodiments may be implemented in other types of ICs, such as custom chipsets, Field Programmable Gate Arrays ("FPGAs"), programmable logic devices ("PLDs"), generic array logic ("GAL") modules, and the like. Furthermore, while the embodiments shown may be implemented using CSRs, it will be appreciated that control signals may also be applied in a variety of other manners, including, for example, directly or may be applied via scan registers or Model Specific Registers ("MSRs"). Additionally, although specific bit field sizes have been illustrated with reference to the embodiments described, e.g., 16-bit threshold for pattern matching (where the bottom 8 bits are used for the threshold), 80-bit mask signal, 3-bit sm_sel, et cetera, various other implementations can also be had.

Accordingly, all such modifications, extensions, variations, amendments, additions, deletions, combinations, and the like are deemed to be within the ambit of the present invention whose scope is defined solely by the claims set forth hereinbelow.

What is claimed is:

1. A performance counter for tracking a number of clock cycles between occurrences of an event of interest in a multi-bit signal, the performance counter comprising:
   circuitry for receiving the multi-bit signal from a bus;
   logic for asserting a run signal responsive to a first occurrence of the event of interest in the multi-bit signal;
   logic for deasserting the run signal responsive to a second occurrence of the event of interest in the multi-bit signal; and
   logic for incrementing a count value on each clock cycle while the run signal is asserted.

2. The performance counter of claim 1 further comprising logic for generating a duration end signal in response to the second occurrence of the event of interest in the multi-bit signal.

3. The performance counter of claim 2 further comprising:
   logic responsive the duration end signal for comparing the count value with a shadow value; and
   logic for updating the shadow value based on results of the comparing.

4. The performance counter of claim 3 further comprising logic for selecting a mode of operation the circuit.

5. The performance counter of claim 4 wherein when a minimum mode of operation is selected, the logic for comparing activates a less than signal responsive to the count value being less than the shadow value.

6. The performance counter of claim 5 wherein the logic for updating comprises logic for replacing the shadow value with the count value responsive to activation of the less than signal.

7. The performance counter of claim 4 wherein when a maximum mode of operation is selected, the logic for comparing activates a greater than signal responsive to the count value being greater than the shadow value.

8. The performance counter of claim 7 wherein the logic for updating further comprises logic for replacing the shadow value with the count value responsive to activation of the greater than signal.

9. The performance counter of claim 1 further comprising a count register for storing the count value.

10. The performance counter of claim 3 further comprising a shadow register for storing the shadow value.

11. A performance counter for tracking a number of clock cycles between occurrences of an event of interest in a multi-bit signal, the performance counter comprising:
    means for receiving the multi-bit signal from a bus;
    means for asserting a run signal responsive to a first occurrence of the event of interest in the multi-bit signal;
    means for deasserting the run signal responsive to a second occurrence of the event of interest in the multi-bit signal; and
    means for incrementing a count value on each clock cycle while the run signal is asserted.

12. The performance counter of claim 11 further comprising means for generating a duration end signal in response to the second occurrence of the event of interest in the multi-bit signal.

13. The performance counter of claim 12 further comprising:
    means responsive the duration end signal for comparing the count value with a shadow value; and
    means for updating the shadow value based on results of the comparing.

14. The performance counter of claim 13 further comprising means for selecting a mode of operation of the circuit.

15. The performance counter of claim 14 wherein when a minimum mode of operation is selected, the means for comparing activates a less than signal responsive to the count value being less than the shadow value.

16. The performance counter of claim 15 wherein the means for updating comprises means for replacing the shadow value with the count value responsive to activation of the less than signal.

17. The performance counter of claim 14 wherein when a maximum mode of operation is selected, the means for comparing activates a greater than signal responsive to the count value being greater than the shadow value.

18. The performance counter of claim 17 wherein the means for updating further comprises means for replacing the shadow value with the count value responsive to activation of the greater than signal.

19. The performance counter of claim 11 further comprising a count register for storing the count value.

20. The performance counter of claim 13 further comprising a shadow register for storing the shadow value.

21. A method of tracking a number of clock cycles between occurrences of an event of interest in a multi-bit signal, the method comprising:
    receiving the multi-bit signal by a performance counter;
    asserting a run signal responsive to a first occurrence of the event of interest in the multi-bit signal;
    deasserting the run signal responsive to a second occurrence of the event of interest in the multi-bit signal; and
    incrementing a count value on each clock cycle while the run signal is asserted.

22. The method of claim 21 further comprising generating a duration end signal in response to the second occurrence of the event of interest in the multi-bit signal.

23. The method of claim 22 further comprising:
    responsive the duration end signal, comparing the count value with a shadow value; and updating the shadow value based on results of the comparing.

24. The method of claim 23 further comprising selecting a mode of operation of the circuit.

25. The method of claim 24 further comprising, when a minimum mode of operation is selected, activating a less than signal responsive to the count value being less than the shadow value.

26. The method of claim 25 wherein the updating comprises replacing the shadow value with the count value responsive to activation of the less than signal.

27. The method of claim 24 further comprising, when a maximum mode of operation is selected, activating a greater than signal responsive to the count value being greater than the shadow value.

28. The method of claim 27 wherein the updating further comprises replacing the shadow value with the count value responsive to activation of the greater than signal.

29. The method of claim 21 further comprising storing the count value in a count register.

30. The method of claim 23 further storing the shadow value in a shadow register.

* * * * *

UNITED STATES PATENT AND TRADEMARK OFFICE
CERTIFICATE OF CORRECTION

PATENT NO. : 7,373,565 B2  
APPLICATION NO. : 11/209215  
DATED : May 13, 2008  
INVENTOR(S) : Richard Adkisson Page 1 of 1

It is certified that error appears in the above-identified patent and that said Letters Patent is hereby corrected as shown below:

In column 2, line 59, delete "zero" and insert -- szero --, therefor.

In column 3, line 14, delete "zero" and insert -- szero --, therefor.

In column 4, line 48, delete "zero" and insert -- szero --, therefor.

In column 5, line 19, delete "zero" and insert -- szero --, therefor.

In column 13, line 51, in Claim 4, after "operation" insert -- of --.

Signed and Sealed this

Fifth Day of August, 2008

JON W. DUDAS  
*Director of the United States Patent and Trademark Office*